(12) United States Patent
Klaus et al.

(10) Patent No.: US 8,013,752 B2
(45) Date of Patent: Sep. 6, 2011

(54) WEIGHTED OUTPUT SENSOR

(75) Inventors: Wolfgang Klaus, Schlierbach (DE);
Stefan Ambos, Dettingen (DE)

(73) Assignee: Leuze electronic GmbH & Co. KG, Owen/Teck (DE)

( * ) Notice: Subject to any disclaimer, the term of this patent is extended or adjusted under 35 U.S.C. 154(b) by 322 days.

(21) Appl. No.: 12/262,587

(22) Filed: Oct. 31, 2008

(65) Prior Publication Data

US 2009/0121886 A1    May 14, 2009

(30) Foreign Application Priority Data

Oct. 31, 2007 (DE) .................. 10 2007 051 979

(51) Int. Cl.
G08B 21/00    (2006.01)

(52) U.S. Cl. .............. 340/635; 340/636.1; 340/652

(58) Field of Classification Search .......... 340/635, 340/636.1, 636.11, 636.12, 636.13, 636.14, 340/636.15, 636.2, 657, 652
See application file for complete search history.

(56) References Cited

U.S. PATENT DOCUMENTS

| | | | | |
|---|---|---|---|---|
| 5,250,801 A | * | 10/1993 | Grozinger et al. | 250/223 B |
| 5,317,499 A | * | 5/1994 | Brakus | 363/56.1 |
| 5,649,253 A | * | 7/1997 | Cocca | 396/392 |
| 5,788,148 A | * | 8/1998 | Burner et al. | 237/2 A |
| 6,759,761 B1 | * | 7/2004 | Schmitt et al. | 307/10.8 |
| 6,972,667 B2 | * | 12/2005 | Flick | 340/426.18 |
| 2002/0105415 A1 | * | 8/2002 | Schmitt et al. | 340/425.5 |

FOREIGN PATENT DOCUMENTS

| | | |
|---|---|---|
| DE | 40 06 893 A1 | 9/1991 |
| DE | 43 31 555 A1 | 3/1994 |
| DE | 43 41 600 C1 | 4/1995 |
| DE | 196 02 681 C1 | 7/1997 |
| DE | 196 25 589 A1 | 1/1998 |
| DE | 197 02 059 A1 | 7/1998 |
| DE | 100 25 662 A1 | 12/2001 |
| DE | 100 36 719 C1 | 12/2001 |

OTHER PUBLICATIONS

German Office Action dated Jun. 6, 2008, issued in corresponding German Patent Application No. 10 2007 051 979.8-56, and its English language translation.

* cited by examiner

*Primary Examiner* — Daniel Previl
(74) *Attorney, Agent, or Firm* — Venable LLP; Robert Kinberg; Christopher Ma

(57) ABSTRACT

A sensor comprises a sensing element to generate output signals corresponding to receiving signals received from an object and an evaluation unit coupled to the sensing element and weighting the output signals from the sensing element with at least one switching threshold to generate object detection signals. The evaluation unit includes a key adapted to selectively reset the at least one switching threshold to higher and lower values through differences in activation of the key.

14 Claims, 1 Drawing Sheet

WEIGHTED OUTPUT SENSOR

CROSS-REFERENCE TO RELATED APPLICATION

This application claims the priority of the German Patent Application DE 10 2007 051 979.8, filed on Oct. 31, 2007, the subject matter of which is incorporated herein by reference.

BACKGROUND OF THE INVENTION

The present invention relates to a sensor comprising a sensing element and an evaluation unit, in which the output signals from the sensing element are weighted with at least one switching threshold for generating object detection signals.

Sensors of this type are generally used for detecting objects and can be embodied as optical sensors, ultrasonic sensors and the like.

A sensor of this type is normally provided with a sensing element for detecting objects. The sensor is furthermore provided with an evaluation unit for evaluating the output signals from the sensing element. In the process, the output signals are weighted with the aid of one or several switching thresholds, thereby generating an object detection signal, which indicates whether or not an object has been detected, preferably within a specified area.

An optical sensor in the form of a light sensor, such as a photoelectric sensor, is one example for such a sensor. This light sensor is provided with a sensing element that consists of a transmitter for emitting light rays and a receiver for receiving light rays, which are connected to the evaluation unit and are integrated into a joint housing together with the evaluation unit.

For detecting an object, the light rays emitted by the transmitter are conducted to the object. These light rays are reflected by the object and then travel back as receiving light rays to the receiver. The output signals from the sensing element are the receiving signals of the receiver. These signals are weighted with a switching threshold for generating a binary object detection signal. The switching threshold defines a detection distance which, in turn, defines an area of coverage. Depending on whether the currently received signal is located above or below the switching threshold, the object detection signal assumes either the switching state "object detected in the detection range" or "detection range clear."

The switching threshold for light sensors of this type is determined during a teach-in process. Following the triggering of such a teach-in process, e.g. by activating a button on the sensor, an object is placed relative to the sensor at the detection distance to be set for the sensor. Following this, the object arranged at the detection distance is scanned with the aid of transmitted light rays and is thus detected. The switching threshold value is then derived from the receiving signals at the receiver output, which are recorded in the process. In the simplest case, the level recorded for the receiving signals is adopted directly as a switching threshold. Besides the value for the receiving signal level, an additional value that is stored in the evaluation unit, a so-called functional reserve, is preferably also added and the sum formed in this way is adopted as the switching threshold. The teach-in process is thus completed and the sensor operation can start, wherein during the operating phase for generating the object detection signal, the currently recorded receiving signals are compared to the switching threshold. If the switching threshold must be changed, then a new teach-in process must be realized, which requires a considerable expenditure in time.

SUMMARY OF THE INVENTION

It is therefore an object of the present invention to provide a sensor of the aforementioned type, for which a parameter setting can be realized easily, quickly, and with low structural expenditure.

The above and other objects are achieved according to one embodiment of the invention wherein there is provided a sensor comprising: a sensing element to generate output signals corresponding to receiving signals received from an object; and an evaluation unit coupled to the sensing element and weighting the output signals from the sensing element with at least one switching threshold to generate object detection signals, the evaluation unit including a key adapted to selectively reset the at least one switching threshold to higher and lower values through differences in activation of the key.

With the sensor according to the invention, switching thresholds can be adjusted as sensor parameters, without requiring a teach-in process. In contrast to the switching threshold setting via teach-in processes, the sensor parameter setting according to the invention can be realized easier and faster.

One essential advantage of the invention is that the same key can be used to reset the switching threshold to higher values as well as lower values. In general, all threshold setting operations can be carried out with the same key, thereby resulting in an extremely low structural expenditure for the embodiment of the setting means. The key, which is preferably arranged on one outside wall of the sensor, furthermore is easy to operate and handle for the respective operator making the adjustment.

The operation of the key is generally configured such that different functionalities of the parameter setting are triggered in the evaluation unit for the sensor, depending on the length of time during which the key is activated or depressed.

Different time windows are defined for this in the evaluation unit, wherein these time windows preferably follow each other continuously, without gap. A specific adjustment operation is assigned to each time window. A check is then carried out in the evaluation unit to determine which time window is associated with the respective length of time for depressing the key. The function respectively associated with this time window is then activated.

It is particularly advantageous if a first and a second time window are defined, wherein the first time window is assigned the setting function "increase switching threshold" and the second time window the setting function "reduce switching threshold." Once an operator activates, meaning depresses, the key then the evaluation unit evaluates the length of time during which the key is activated and the switching threshold is either increased or reduced, depending on the time window into which the length of activation falls.

The second time window in particular is preferably associated with longer times than the first time window. Thus, corresponding to the subjective finding of the operator, the switching threshold is increased if the key is depressed for a longer period and the switching threshold is decreased if the key is depressed for a shorter period.

The switching threshold is advantageously changed by the same amount each time the key is activated. That is to say, the step distance for changing the switching threshold is identical for the increase as well as for the reduction of the switching threshold. By depressing the key several times, the switching threshold can thus be increased or reduced successively using the aforementioned steps. Since the step distance for increasing and for reducing the switching threshold is identical, any change that is made to increase or reduce the switching threshold several times can also be reversed by making a corresponding number of changes in the opposite direction.

With a sensor having a single switching threshold that must be set, it is sufficient to have the two adjustment functions "increase switching threshold" and "reduce switching threshold."

If several switching thresholds must be set in a sensor, a selection of switching thresholds to be adjusted can be provided as additional functions to be set. For a sensor requiring the setting of two switching thresholds, a third and fourth time window are provided in addition to the first and second time window, which are assigned the function of increasing and/or reducing the switching thresholds. The third and fourth time windows follow the first and second time windows, preferably in the direction of longer time periods.

To realize a switching threshold setting, the key must initially be depressed for a longer period of time for selecting the switching threshold to be reset. This is followed by depressing the key for a shorter time to reset the switching threshold, wherein this threshold is respectively increased or reduced, depending on whether the operation of depressing the key falls into the first or second time window.

The functionality of the parameter setting can be expanded by defining additional time windows. If the length of time for activating the key falls into such an additional time window, then different parameter settings can be selected and changed. Examples of such additional parameter settings are a light/dark switching operation for optical sensors, as well as a setting for prolonging the pulse. This latter function results in prolonging the generated object detection signal for short object interventions, meaning for sensor signals corresponding to the detection of an object that is present only for a short period of time. It means that if an object is detected only briefly, the object report generated by this detection is present for a longer time period of time, so that it can be evaluated in a higher-ranking unit, such as a control unit.

The switching threshold setting according to the invention can be used with all different types of sensors, in particular with optical sensors or ultrasonic sensors.

BRIEF DESCRIPTION OF THE DRAWINGS

These and other features and advantages of the invention will be further understood from the following detailed description with reference to the accompanying drawings, showing in.

DETAILED DESCRIPTION

Figure 1:
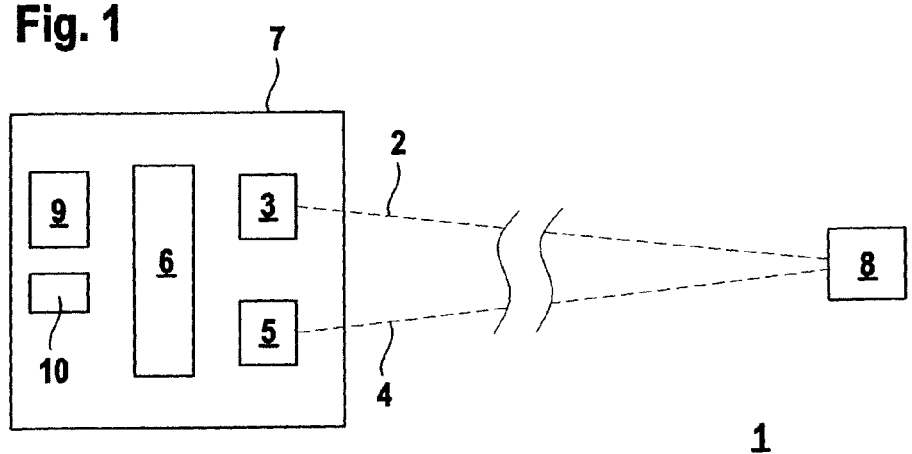
FIG. 1 A schematic representation of an optical sensor according to the invention.

FIG. 1 schematically illustrates the configuration of an optical sensor 1, operating on the basis of the light sensing principle. The optical sensor 1 is provided with a sensing element, comprising a transmitter 3 for emitting light rays 2 and a receiver 5 for receiving light rays 4, wherein the transmitter 3 can take the form of a light-emitting diode or a laser diode. In the simplest case, the receiver 5 is embodied as photo-electric diode. The transmitter 3 and the receiver 5 are connected to an evaluation unit 6 in the form of a microprocessor or the like. The evaluation unit 6 is used for activating the transmitter 3 and for evaluating the signals received at the receiver 5. The components of the optical sensor 1 are installed inside a housing 7.

For object detection, the light rays 2 emitted by the transmitter 3 are conducted through a window that is not shown herein, thus arriving in an area to be monitored. The light rays 2, which are reflected by an object 8, are conducted as receiving light rays 4 through the window and to the receiver 5.

In order to generate an object detection signal, the receiving signals generated in this way and present at the receiver 5 are weighted with two switching thresholds. In the simplest case, amplitude values of the receiving signals are weighted with the switching thresholds. For a sensing element embodied as a distance sensor, distance values can be weighted with the switching thresholds as receiving signals for the receiver 5.

The object detection signal obtained by weighting the receiving signals with the switching thresholds generally indicates whether or not an object 8 is located within a specified detection area, which forms a part of an area of coverage. The switching thresholds define the limits of the detection area, thus forming so-called detection distances. The object detection signal is emitted via a switching output that is not shown herein.

A key 9 that can be activated by an operator is arranged on the outside of the housing 7 for realizing the setting of the switching thresholds or in general for adjusting parameters. A display element 10 in the form of a light-emitting diode is assigned to this key 9. The key 9 and the display element 10 are connected to the evaluation unit 6 and are controlled by this unit. The display element 10 indicates to the operator whether the depressing of the key has been recorded in the evaluation unit 6.

The key 9 makes it possible to generate and realize different setting functions by activating or depressing the key 9 for different periods of time. The length of time for activating the key 9 is recorded and evaluated in the evaluation unit 6. Depending thereon, a specific setting function is realized in the evaluation unit 6.

Figure 2:
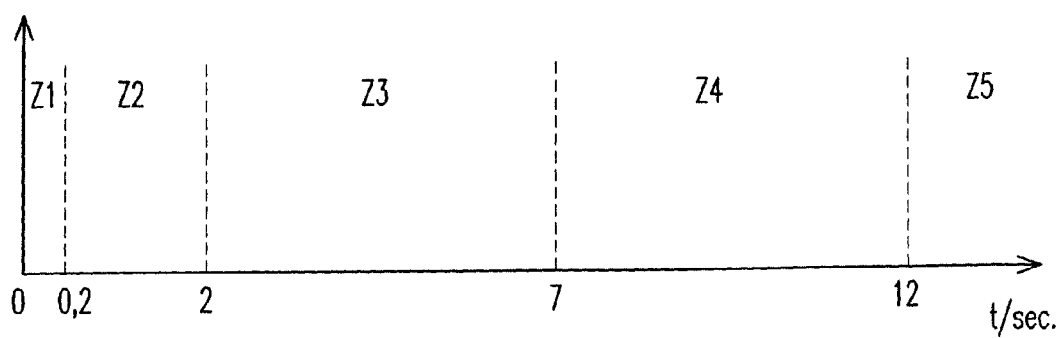
FIG. 2 A graph showing the representation of time windows specified in the evaluation unit of the optical sensor according to FIG. 1.

FIG. 2 illustrates this evaluation. The length of time recorded in the evaluation unit 6 for activating the key 9 is checked in order to determine whether it falls into one of the time windows Z1-Z5, shown in FIG. 2. The time window Z1 is formed by the time interval $0 < t \leq 0.2$ s. The time window Z2 is formed by the time interval $0.2$ s $< t \leq 2$ s. The time window Z3 is formed by the time interval $2$ s $< t \leq 7$ s. The time window Z4 is formed by the time interval $7$ s $< t \leq 12$ s. The time window Z5 is formed by the time interval $t > 12$ s.

The time windows Z2-Z4 are assigned setting functions in the evaluation unit 6 for setting the switching thresholds. Additional functions are assigned to the time window Z5, such as the light/dark switching of the optical sensor 1 or the like.

The type of switching threshold to be set must be selected during an initial step for realizing the setting of a switching threshold. If a first switching threshold is to be selected, then the key 9 is depressed long enough for the key activation to fall into the time window Z3. If the activation interval recorded in the evaluation unit 6 falls into the time window Z3, then the first switching threshold to be set is activated by the evaluation unit 6. The same process is used for activating the second switching threshold, wherein the length of time for activating the key in that case must fall into the time window Z4.

Once the switching thresholds have been selected, their value is changed as a result of further activations of the key. If, in the process, the key 9 is depressed once for a long enough interval so that the duration of the key activation falls into the first time window Z1, then the starting value $S_0$ of the switching threshold is reduced by the amount of $\Delta S$. On the other hand, if the duration of the key activation falls into the time window Z2, then the starting value $S_0$ of the switching threshold is increased by the same amount of $\Delta S$. The value of $\Delta S$ in this case amounts to less than 5% of the starting value $S_0$ of the switching threshold, which is specified in the evaluation unit 6. The amount $\Delta S$, which represents the step value for resetting the switching threshold either to a positive or a negative value, is also stored in the evaluation unit 6.

If the switching threshold value is to be increased from the starting value $S_0$ to the value $S_0 + n \cdot \Delta S$, then the key 9 must be depressed n times, each time long enough so that the duration of the key activation falls into the time window Z2.

The same is true for reducing the value of the switching threshold from $S_0 - n \cdot \Delta S$. In that case, the key must be activated n times so that each time the duration of the key activation falls into the time window Z2.

It will be understood that the above description of the present invention is susceptible to various modifications, changes and adaptations, and that the same are intended to be comprehended within the meaning and range of equivalents of the appended claims.

What is claimed is:

1. A sensor comprising:
   a sensing element to generate output signals corresponding to receiving signals received from an object; and
   an evaluation unit coupled to the sensing element and weighting the output signals from the sensing element with at least one switching threshold to generate object detection signals, the evaluation unit including a key configured to selectively reset the at least one switching threshold to higher and lower values through differences in activation of the key,
   wherein the differences in activation of the key are a function of activation time period of the key,
   wherein at least first and second different time windows are specified in the evaluation unit, and the at least one switching threshold is reset to higher values if the activation time period of the key falls into the first time window, and the at least one switching threshold is reset to lower values if the activation time period of the key falls into the second time window.

2. The sensor according to claim 1, wherein the key is adapted so that with a one-time activation of the key and an activation time period that falls into the first or second time window, the at least one switching threshold is respectively reset by the same amount.

3. The sensor according to claim 1, wherein the first time window is defined by a time interval between 0.2s and 2s.

4. The sensor according to claim 1, wherein the first time window has a lower limit that forms an upper limit of the second time window.

5. The sensor according to claim 4, wherein first and second switching thresholds are settable with the aid of the key.

6. The sensor according to claim 5, wherein the key is adapted so that different periods of activation time are selectable to set the first or second switching threshold, respectively.

7. The sensor according to claim 6, wherein a third and fourth time window is specified in the evaluation unit, the first switching threshold to be set is selected if the activation time for the key falls within the third time window, and the second switching threshold to be set is selected if the activation time for the key falls within the fourth time window.

8. The sensor according to claim 7, wherein the third time window is defined by a time interval between 2s and 7s.

9. The sensor according to claim 8, wherein the fourth time window is defined by a time interval between 7s and 12s.

10. The sensor according to claim 9, wherein the sensor has additional functions that are settable by activation time periods of the key that exceed the upper limit of the fourth time window.

11. The sensor according to claims 1, further comprising a housing for the sensing element and the evaluation unit, wherein the key is arranged on an outside of the housing.

12. The sensor according to claim 1, and further including a display element associated with the evaluation unit and the key to indicate whether an activation of the key was recorded in the evaluation unit.

13. The sensor according to claim 12, wherein the display element comprises a light-emitting diode.

14. The sensor according to claim 1, wherein the sensor comprises at least one of an optical sensor or an ultrasonic sensor.

* * * * *